(12) United States Patent
Klinke (10) Patent No.: US 8,672,284 B2
(45) Date of Patent: Mar. 18, 2014

(54) GEAR WITH AT LEAST TWO GEARING STAGES, A LINEAR ACTUATOR INCLUDING SUCH A GEAR AND A TABLE LEG INCLUDING SUCH A LINEAR ACTUATOR

(75) Inventor: Norbert Klinke, Augustenborg (DK)

(73) Assignee: Linak A/S, Nordborg (DK)

( * ) Notice: Subject to any disclaimer, the term of this patent is extended or adjusted under 35 U.S.C. 154(b) by 457 days.

(21) Appl. No.: 12/736,840

(22) PCT Filed: Jun. 8, 2009

(86) PCT No.: PCT/DK2009/000134
§ 371 (c)(1),
(2), (4) Date: Nov. 15, 2010

(87) PCT Pub. No.: WO2009/146707
PCT Pub. Date: Dec. 10, 2009

(65) Prior Publication Data
US 2011/0061574 A1 Mar. 17, 2011

(30) Foreign Application Priority Data
Jun. 6, 2008 (DK) .................................. 2008 00775

(51) Int. Cl.
*F16H 55/00* (2006.01)
(52) U.S. Cl.
USPC .......................................... 248/422; 248/405
(58) Field of Classification Search
USPC .................. 248/422, 127, 158, 161, 405; 108/144.11, 147, 147.19
See application file for complete search history.

(56) References Cited

U.S. PATENT DOCUMENTS

| 186,757 | A | * | 1/1877 | Ramseyer | ...................... 248/422 |
| 4,627,591 | A | * | 12/1986 | Heckmann | ...................... 248/411 |
| 5,685,510 | A | * | 11/1997 | Frankish | ..................... 248/188.4 |

(Continued)

FOREIGN PATENT DOCUMENTS

| DE | 20212935 | 1/2003 |
| FR | 2747280 | 10/1997 |

OTHER PUBLICATIONS

English Abstract of DE20212935.

*Primary Examiner* — Steven Marsh
(74) *Attorney, Agent, or Firm* — Dykema Gossett PLLC (57) ABSTRACT

Gear, preferably for actuators of the type, where an electric motor (1) through the gear drives an activation element, such as a pivotal arm or a longitudinally movable element, and where the gear has at least two gearing stages. The first stage is constituted by a worm drive with a worm—(11; 13a, 13b) and the subsequent gearing stage is constituted by a crown and bevel wheel (23; 16a, 16b). The crown wheel faces towards the worm drive and has a power take-off (24, 27) in extension of or in all essentials in extension of the worm (11) or parallel thereto. The bevel wheel (16a, 16b) is with its axis of rotation arranged perpendicular in relation to the axis of rotation of the worm (11), and the worm wheel (13a, 13b) is in drive connection with the bevel wheel (16a, 16b) through a gear train (14a, 15a; 14b; 15b). Thus a relatively compact transmission with a high gearing is achieved, and by having worm wheels, toothed gearing and bevel and crown wheels of plastic the transmission is in addition silent. A good tooth mesh between bevel wheel and crown wheel is particularly important. The gear may be used in a linear actuator which again may be used in a height adjustable table leg.

8 Claims, 6 Drawing Sheets

(56) References Cited

U.S. PATENT DOCUMENTS 6,474,246 B2 * 11/2002 Hsu ............................. 108/147
6,770,006 B2 8/2004 Abrahamsen
7,908,981 B2 * 3/2011 Agee ............................ 108/147
2006/0169862 A1 * 8/2006 Liu ............................... 248/422

* cited by examiner

GEAR WITH AT LEAST TWO GEARING STAGES, A LINEAR ACTUATOR INCLUDING SUCH A GEAR AND A TABLE LEG INCLUDING SUCH A LINEAR ACTUATOR

BACKGROUND OF THE INVENTION

1. Field of the Invention

The present invention relates to a gear for a linear actuator and to a linear actuator and a lifting column which contains such gear.

2. The Prior Art

EP 1 272 778 B1 to Linak A/S discloses an actuator having a gear with two gearing stages, the first stage being a worm drive with a worm and the subsequent gearing stage being a crown and bevel wheel, where the bevel wheel is arranged in extension of the worm wheel and where the crown wheel faces towards the worm drive and has a power take-off in the shape of a gear wheel in extension of the worm. The patent holder Linak A/S has realized the actuator in the shape of a rotary actuator, which is marketed under the name RA40. The gear has proven to be fine, but the toothing on the crown and bevel wheel is complicated and as such not optimal as regards transmission of power and noise. On the other hand, the gear is attractive as it has a large reduction and is compact.

The purpose of the invention is to provide a gear with a better solution for the toothing between the crown and bevel wheel while simultaneously maintaining of the compact structure of the gear and height reduction.

SUMMARY OF THE INVENTION

This is achieved according to the invention in that the bevel wheel with its axis of rotation is arranged perpendicular in relation to the axis of rotation of the worm, and that the worm wheel is in drive connection with the bevel wheel through a gear train. Thus a good toothing between the crown and bevel wheel is achieved, as the axis of rotation of the bevel wheel extends as a radius of the crown wheel. Simultaneously, the large reduction and compact design of the gear may be maintained.

The gearing between the worm wheel and the bevel wheel may in its most simple design be a couple of spur or helical gear wheels, where one gear wheel is in connection with the worm wheel and the other is in connection with the bevel wheel. This is above all simple and not very space-consuming. The gearing between the spur/helical gear wheels is preferably chosen as 1:1, but in principle there could be chosen another gearing.

In order to achieve a good transmission of power, a design is chosen where the bevel wheel is conic frustum shaped with its smallest diameter situated closest to the axis of rotation of the crown wheel and having its largest diameter closest to the circumference of the crown wheel, and the toothing of the crown wheel thus has a shape corresponding thereto, i.e. inclining downwardly towards the circumference of the crown wheel reckoning from the axis of rotation of the crown wheel. This results in a design of the teeth where the material thickness is thickest, where the transmission of power is largest. The alternative embodiment where the bevel wheel acuminates outwards leaves as far as it goes more room within the circumference of the crown wheel, but the first-mentioned embodiment is preferred for a good transmission of power.

Crown and bevel wheels may be manufactured with simple moulding tools, by plastics moulding with a two-jawed tool, so that the manufacturing costs basically may be kept at a low level.

In that the transmission comprises an additional worm wheel and bevel wheel arranged diametrically opposite the first worm and bevel wheel, a balanced distribution of the forces is achieved. The worm and the crown wheel are stabilized, and the force distribution may be used for transferring greater forces or reducing dimensions or selection of alternative materials.

In an embodiment, the worm wheel is formed integral with the spur gear wheel relating thereto, and the bevel wheel is likewise formed integral with the spur gear wheel relating thereto, which ensures optimum interconnection between these and also facilitates the mounting. Worm and bevel wheels may be made as an integral item of plastics with a two-jawed injection moulding tool.

The axles for worm wheel, bevel wheel and the gear wheels in the gear train there between may be designed integral with the gear wheels, irrespective of whether they are made from metal or plastic. Due to noise considerations and with regard to the production costs it is preferred to make the gear wheels of plastics by means of injection moulding. In that respect, it has according to the invention due to strength considerations proven to be expedient to equip the gear wheels with steel axles.

The individual components of the gear may be held together in various ways, e.g. with a front fixture, but particularly expedient it occurs in a cylindrical or almost cylindrical gear housing having a first chamber for the worm, bevel wheels, worm wheels and the gear train there between and a second chamber for the crown wheel. As the gear wheels are located in closed chambers, the lubricant is held on the gear wheels and is forcibly fed around on these. Expediently, the gear housing has a cross section corresponding to or essentially corresponding to the cross section of the motor. For closing the end of the gear housing facing towards the motor housing, the end cover of the motor housing may expediently be used as covering. Since the gear housing is open towards the end, this also eases the assembly of the gear wheels and the housing may be designed as a hole. The gear housing may thus be moulded as an integral whole whether it is in plastic, as it is preferred, or in light metal.

According to the invention the two chambers in the gear housing are particularly expedient made with a traversal wall, where the side of the traversal wall facing towards the motor housing is shaped with recesses for bevel wheels, worm wheels and the gear train there between, while the other side of the traversal wall has a shaft journal for the crown wheel, and where the worm with at least its outer end is embedded in a hollow in the shaft journal. This embodiment eases the assembly of the gear wheels and the application of lubricant. This also applies when the gear wheels are furnished with steel axles, as the gear wheels are positioned by placing these in the traversal wall in the gear housing and pressing the steel axles through holes therefor in the outer wall of the gear housing. The assembly of the crown wheel is also fairly simple, as it is placed over the shaft journal. This may be retained in various ways e.g. by means of a screw in the shaft journal, a locking ring or in a snap-locking connection. It will be appreciated that there are clearances for the bevel wheels in the partition wall, so that they are in mesh with the crown wheel.

The power take-off on the crown wheel may be designed in various ways, depending of the application in which the gear should be incorporated. However, it is essential that the take-off is in extension of the motor shaft. The power take-off may be a gear wheel, which e.g. directly may be used as a sun wheel when integrated with a planetary gear or another type of gearing. The power take-off may also be designed for connection with an arm, shaft or spindle. For connection to a drive shaft in the nature of a drive tube, the power take-off is expediently constructed with entrainment means, which may be brought into mesh with grooves in the drive tube. For reduction of noise and for absorption of possible inaccuracies in the centering, a rubber bushing may be inserted over the entrainment means.

The invention further relates to a linear actuator comprising at least one spindle with a spindle nut connected to a drive tube, and where the spindle is driven by a reversible electric motor with the inventive gear. In a particularly attractive embodiment the actuator comprises a tubular support connected to the motor housing and which surrounds the drive tube and spindle. The tubular support preferably has a length, so that it covers the spindle and drive tube and thus protects these during transport and assembly. This is particularly expedient, when the spindle consists of a spindle unit with a solid spindle and a surrounding hollow spindle.

Further, the invention likewise relates to a table leg comprising at least two mutually telescopic pipe members, which are driven by a linear actuator.

Embodiments of the invention will be explained more fully below with reference to the accompanying drawings, wherein.

DETAILED DESCRIPTION OF THE PREFERRED EMBODIMENTS

Figure 1:
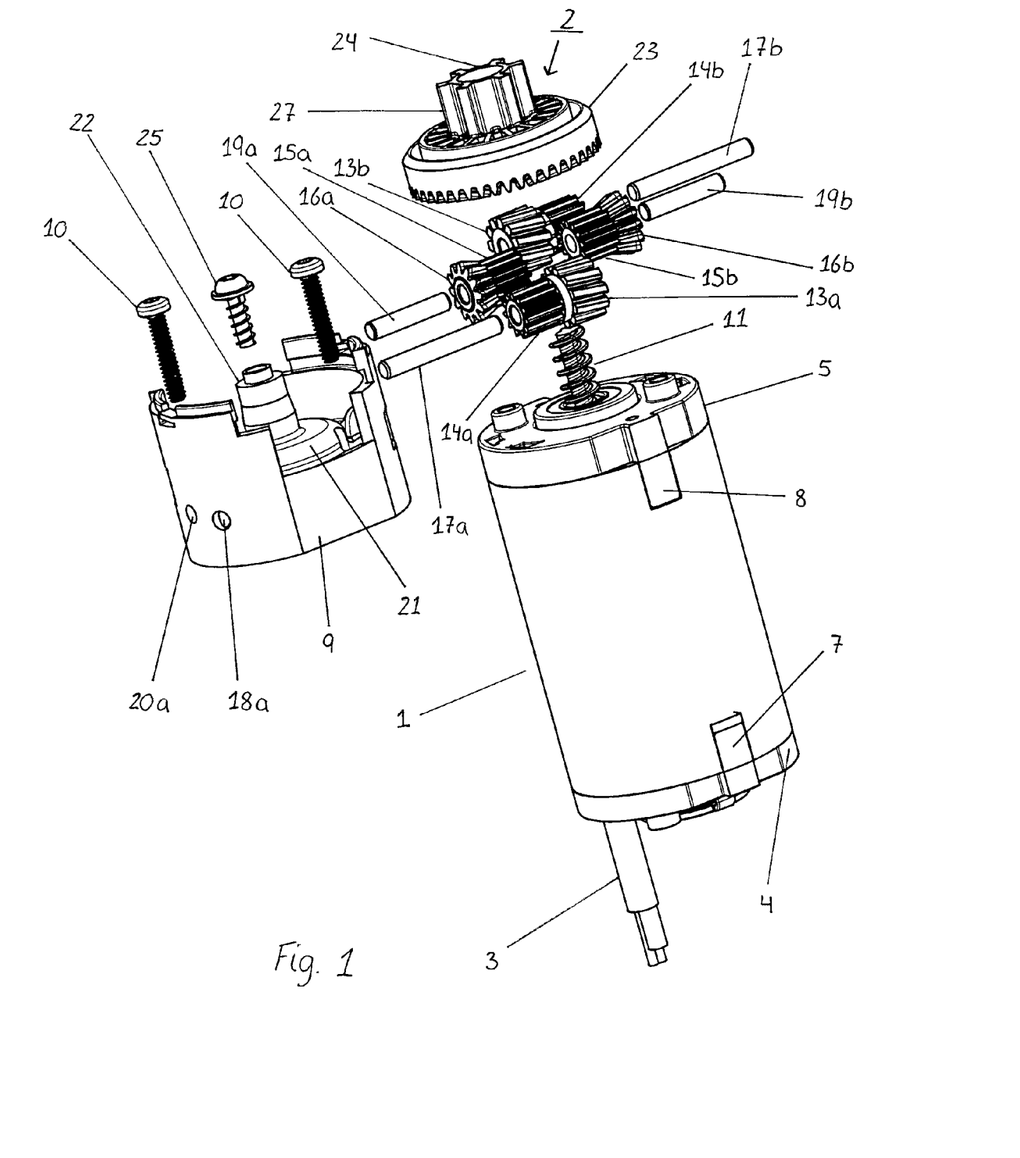
FIG. 1 shows an exploded view of a gear according to the invention mounted on the front of a low-voltage DC-motor.
Figure 2:
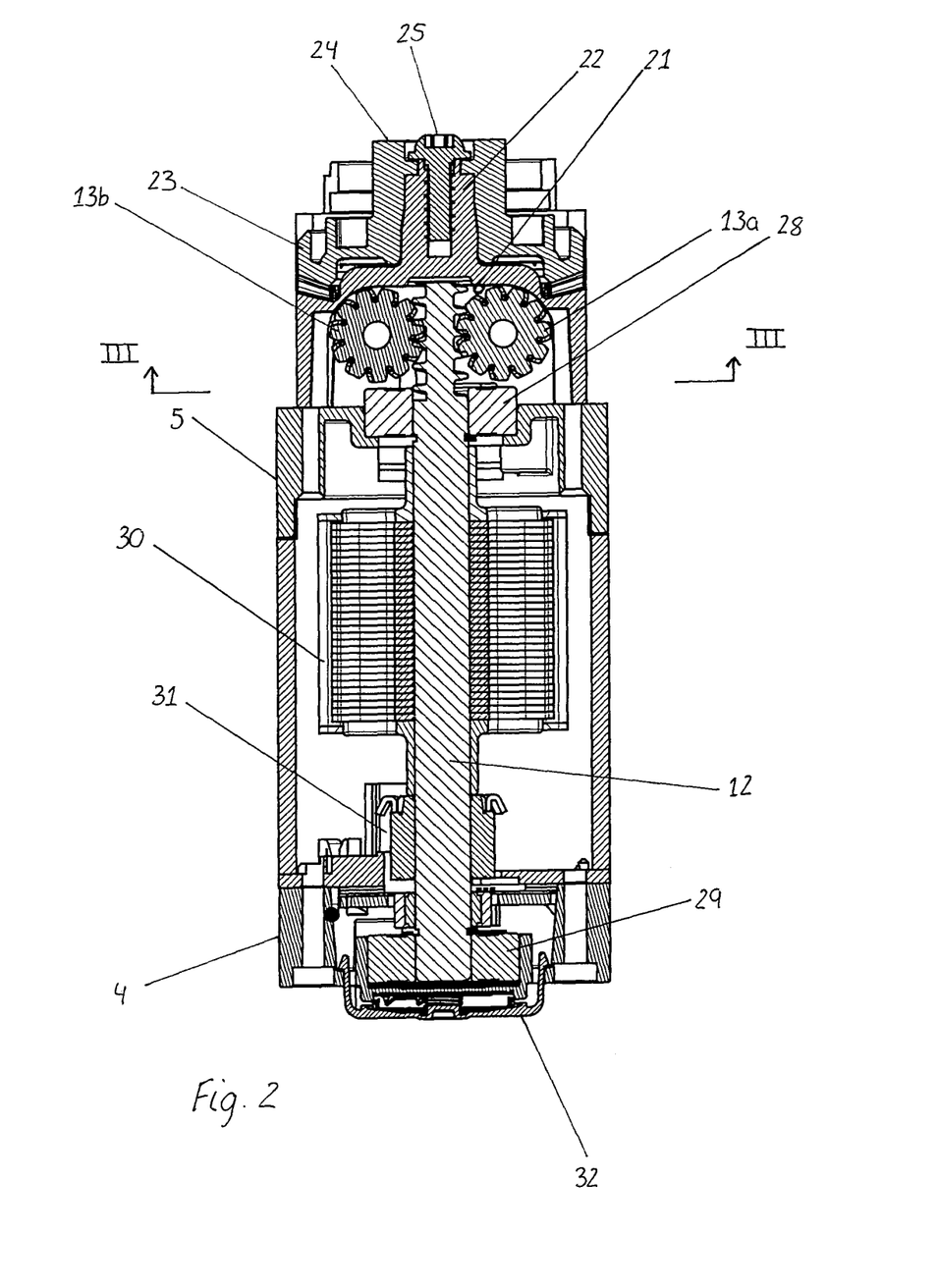
FIG. 2 shows a longitudinal section through the gear and motor of FIG. 1.
Figure 3:
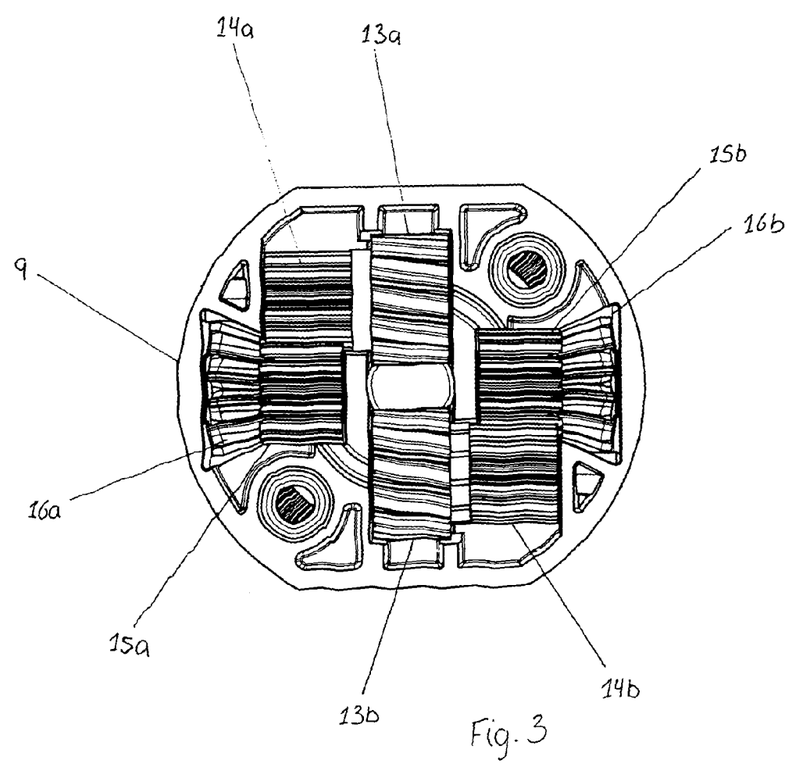
FIG. 3 shows a cross section along III-III in FIG. 2.
Figure 4:
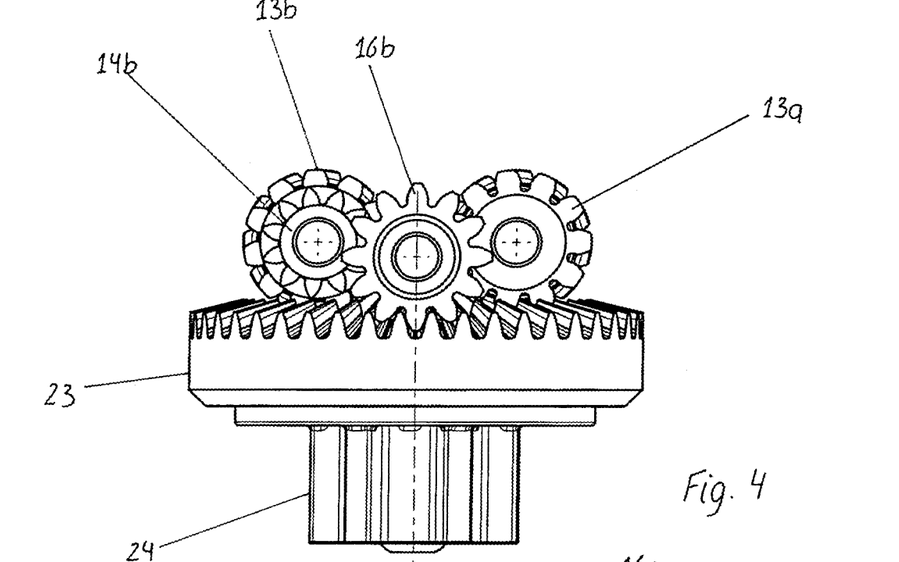
FIG. 4 shows the gear wheels in the gear seen from the side.
Figure 5:
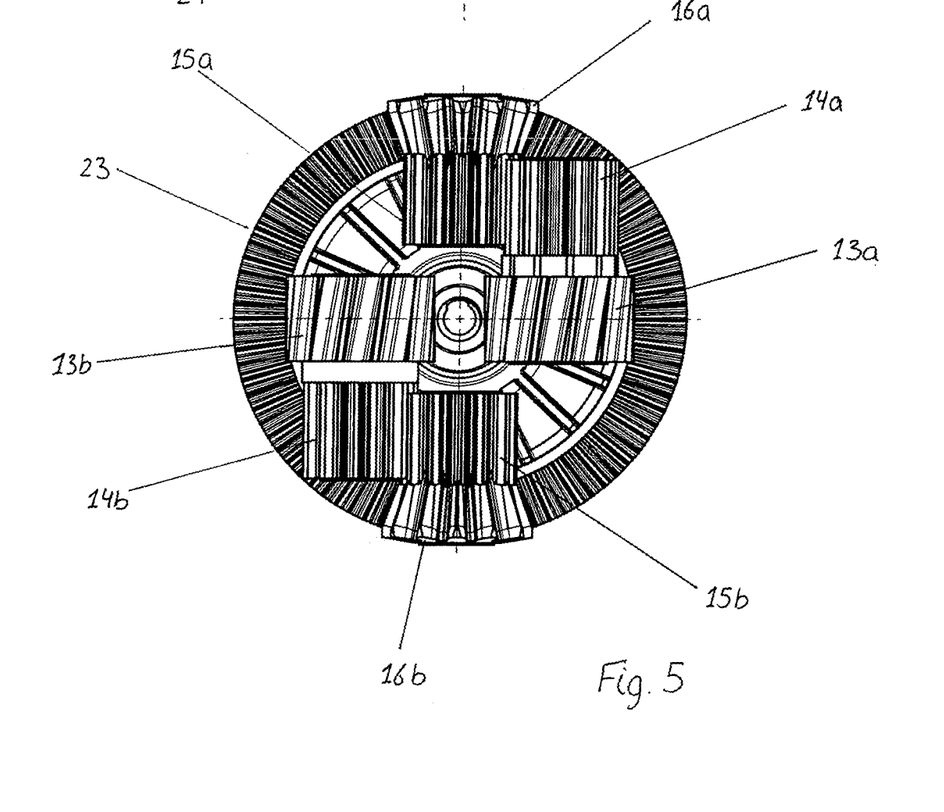
FIG. 5 shows the same as FIG. 4 but seen from above.
Figures 6, 7, 8, 9:
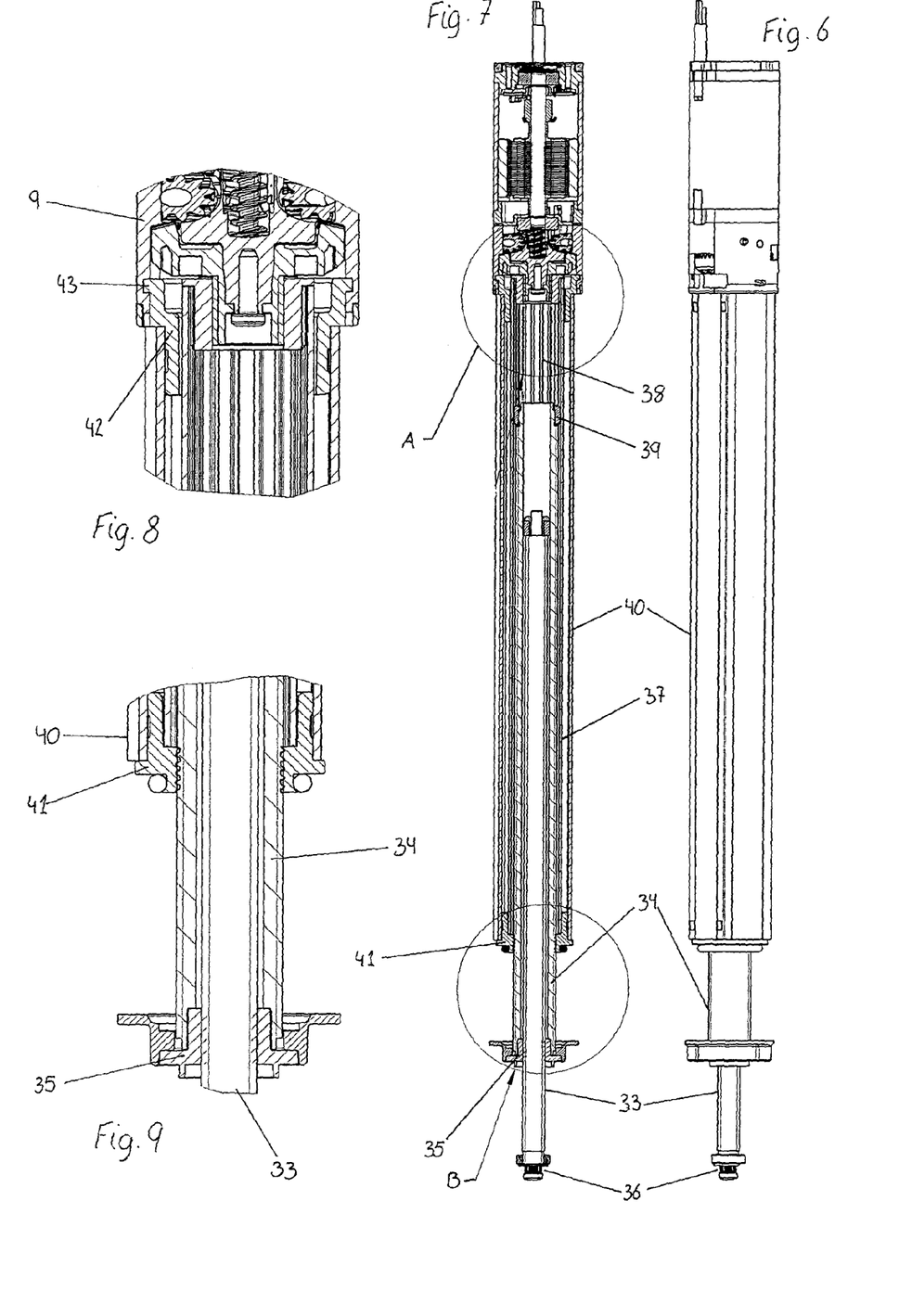
FIG. 6 shows a linear actuator seen from the side, where the spindle unit is slightly extended outwardly.
FIG. 7 shows a longitudinal section through the actuator in FIG. 6.
FIG. 8 shows a detailed view A in FIG. 7 of the interconnection of the motor/gear unit with the spindle unit.
FIG. 9 shows a detailed view B in FIG. 7 of the lower end of the actuator.
Figure 10:
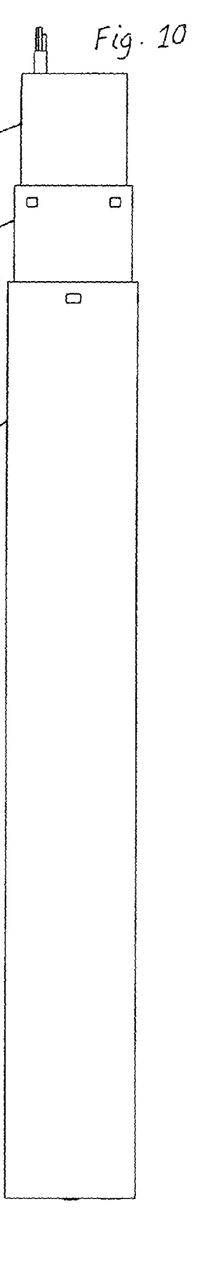
FIG. 10 shows a lifting column in the shape of a table leg seen from the side.
Figures 11, 12, 13:
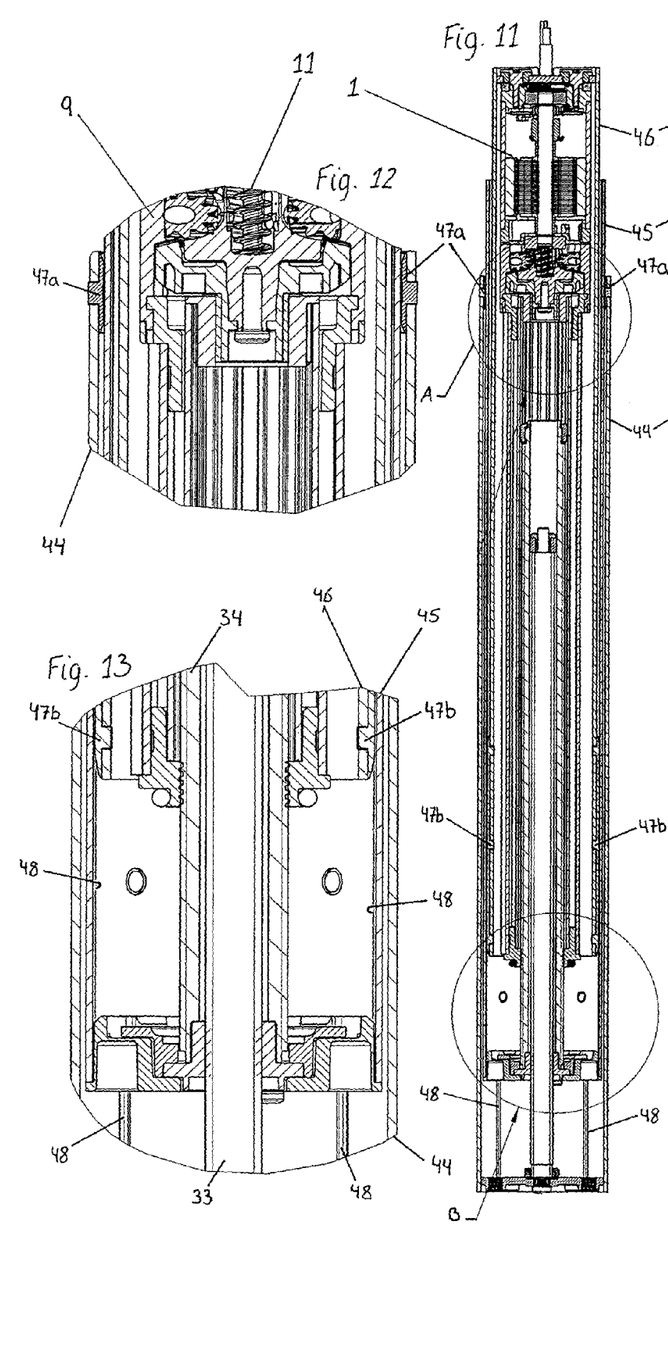
FIG. 11 shows a longitudinal section in the lifting column shown in FIG. 10.
FIG. 12 shows a detailed view A in FIG. 11.
FIG. 13 shows a detailed view B in FIG. 11.

FIG. 1 shows an exploded view of a permanent, low-voltage motor 1 with an in-line front gear 2. The motor 1 is connected to a power supply and a control via a cable 3. Further, the motor 1 comprises a motor housing consisting of an outer cylindrical jacket with a rear cover 4 and a front cover 5, which both have snap-locking legs 7,8 for snapping onto the cylindrical jacket. The front gear comprises a cylindrical gear housing 9, which with a couple of screws 10 may be mounted on the front cover 5. The gear comprises a worm 11 in extension of a motor shaft 12 (cf. FIG. 2). The worm 11 is in mesh with a couple of diametrically located worm wheels 13a, 13b. The worm 11 is of steel, while the worm wheels 13a, 13b are of plastic for a low noise level. Integral with the worm wheels 13a, 13b there is a spur gear wheel 14a, 14b, which is in mesh with another corresponding spur gear wheel 15a, 15b. Integral with the latter gear wheel 15a, 15b there is a bevel wheel 16a, 16b. The two sets of spur gear wheels 14a, 15a; 14b, 15b are adapted so that the two bevel wheels 16a, 16b are located in extension of each other. Due to strength considerations, the worm wheels with spur gear wheels 14a, 15a; 14b, 15b are embedded on a steel axle 17a, 17b, which with the ends protrudes into respective holes 18a in the side wall of the gear housing 9. Bevel wheels 16a, 16b with spur gear wheels 15a, 15b are likewise embedded on respective steel axles 19a, 19b, which with the ends are embedded in holes 20a in the side wall of the gear housing 9 and in holes in a internal cap 21 in the gear housing 9. This cap has an upright journal 22. The bevel wheels 16a, 16b are in mesh with the toothed rim on a crown wheel 23, which has a central tubular part 24, with which the crown wheel 23 rests on the journal 22 on the gear housing 9 and is guided hereon. The crown wheel 23 is retained on the journal 22 by means of a screw 25, which is screwed into the journal 22. The tubular part 24 of the crown wheel is on the outside designed with entrainment means 27 functioning as power take-offs. It should be noted that there are clearances (cf. FIG. 3) for the bevel wheels 16a, 16b in the cap 21, so that these may enter into mesh with the crown wheel 23. It will be appreciated that the front gear with the exception of the worm 11 may be assembled as a finished unit and mounted on the front end of the motor. It is noted from FIG. 2 that the motor shaft 12 at the front at the beginning of the worm is embedded with a ball bearing 28 in the front cover 5, while the rear end of the motor shaft 12 with a ball bearing 29 is embedded in the rear cover 4. This ensures a very good and stable embedment of the motor shaft 12. For the sake of completeness it is noted that 30 is the rotor of the motor, 31 is the commutator, while 32 is a cover with a specially designed squeeze protection.

FIGS. 6-9 show a linear actuator for incorporation into a telescopic table leg. The linear actuator comprises a solid spindle 33 and a hollow spindle 34, both having external threads. At the lower end of the hollow spindle a spindle nut 35 for the solid spindle 33 is secured, said spindle nut being designed as a bushing with internal threads. By rotation of the hollow spindle 34, this will screw itself up the solid spindle 33, as this is secured against rotation at its free end 36. The hollow spindle 34 is surrounded by a drive tube 37, which on the inner side has a number of axially running grooves 38. At the upper end of the hollow spindle 34, a ring 39 is secured to the outer side, said ring having a number of fins on the outside, which rests in the grooves 38 on the drive tube. Surrounding the drive tube 37 there is a tubular support tube 40 where a spindle nut 41 for the hollow spindle 34 is secured to its lower end. The spindle nut 41 is designed as a bushing with internal threads. When the drive tube 37 is rotated, the tubular support 40 will screw itself up the hollow spindle 34, as the tubular support at its upper end is secured against rotation. As the hollow spindle 34 is rotated, it will screw itself synchronously up the solid spindle 33 as described above, i.e., the axial movement is the overall movement of both the hollow and the solid spindle.

The drive unit is constituted by the motor and gear unit as described above and shown in FIGS. 1-5. The drive tube 37 is driven by the crown wheel 23 in that the drive tube is pushed over the central tubular part 24 of the crown wheel, so that its entrainment means 27 rests in the grooves 38 on the drive tube 37. The tubular support tube 40 is secured to the cylindrical gear housing 9. For this purpose, the gear housing 9 is equipped with a stepped down, tubular coupling section 42, which with a round-going collar 43 rests in a groove on the inside of the gear housing 9. The tubular support tube 40 is pushed over the stepped down part of the coupling section 42 and is retained by local deformations in the tubular support tube, said deformations being in locked mesh with local recesses in the coupling section. The tubular support tube is thus locked hereto both axially as well as secured against rotation. The axial forces from the load are led through the motor jacket and via the gear housing 9 to the tubular support tube 40 and through the spindle nut 41 to the hollow spindle 34 and through the spindle nut 35 to the solid spindle 33. The gear and the rotor of the motor are thus not exposed to externally imposed axial forces and consideration therefor in this connection is thus avoided.

FIGS. 10-13 show a telescopic table leg comprising three telescopic members 44, 45, 46 with a circular cross section. In the slit between the three members, sliders 47, 47b are arranged. At the upper end of the telescopic members 44 and 45 four sliders 47a in the form of solid bricks of plastic are arranged. The sliders are arranged with the same mutual distance on the external circumference of the members and retained by means of a boss protruding into a recess in the wall of the members. On the lower end of the members 45, 46 four elongated sliders 47b are arranged with the same mutual distance on the outside of these. These are likewise of plastic and retained by means of bosses protruding into the side wall of the member. For securing the members against rotation these sliders 47b has a rib on the outside which rests in a longitudinal track 48 on the surrounding member. As drive unit a linear actuator as mentioned above and as shown in FIGS. 6-9 is used. The outermost fixed telescopic member 44 is at its lower end equipped with a base part 47 in the form of a plate. In the base part there are screw holes for securing to a foot. The end 36 of the solid spindle 33 is secured in the base part. The intermediate telescopic member 45 is with its lower end secured to the lower end of the hollow spindle in such a manner that it allows for free rotation of the hollow spindle. This is designed as a bearing, as disclosed in DE 39 10 814 A1 SMS Hasenclever GmbH and FR 2 747 280 BI2S S.A., where the intermediate member is coupled to the hollow spindle. In the longitudinal direction, the intermediate telescopic member thus moves with the hollow spindle. The innermost telescopic member 46 is with its upper end secured to the upper end of the motor of the drive unit, namely retained by means of a locking ring 48.

The invention claimed is:

1. An actuator for operating an activating element, said actuator comprising:
   an electric motor which defines a front end and which includes an output shaft extending away from the front end, said output shaft defining a shaft axis, and
   a transmission for connection to the activating element, said transmission comprising a first stage comprising a worm gear aligned with said output shaft and driven thereby and a first worm wheel driven by said worm gear, a second stage comprising a crown wheel which faces the front end of the electric motor and a first bevel wheel which drives the crown wheel, said crown wheel including a power take-off means which extends in substantial coaxial alignment with the axis of said output shaft, and said first worm wheel being spaced from said first bevel wheel, and a gear train between the first worm wheel and the first bevel wheel for rotation of said first bevel wheel with rotation of said first worm wheel, said gear train comprising a gear wheel.

2. The actuator according to claim 1, wherein the worm wheel and the gear wheel are one-piece.

3. The actuator according to claim 1, including a spindle with a spindle nut connected to a drive tube.

4. An actuator for operating an activating element, said actuator comprising:
   an electric motor which defines a front end and which includes an output shaft extending away from the front end, said output shaft defining a shaft axis,
   a transmission for connection to the activating element, said transmission comprising a first stage comprising a worm gear aligned with said output shaft and driven thereby and a first worm wheel driven by said worm gear, a second stage comprising a crown wheel which faces the front end of the electric motor and a first bevel wheel which drives the crown wheel, said crown wheel including a power take-off means which extends in substantial coaxial alignment with the axis of said output shaft, and said first worm wheel being spaced from said first bevel wheel, and a gear train between the first worm wheel and the first bevel wheel for rotation of said first bevel wheel with rotation of said first worm wheel, and wherein the transmission comprises a further worm wheel and bevel wheel arranged diametrically opposite the first worm and bevel wheel.

5. The actuator according to claim 4, wherein worm wheels, bevel wheels and the gear wheels in the gear train include steel axles.

6. The actuator according to claim 5, including a substantially cylindrical gear housing having a first chamber for the worm, bevel wheels, worm wheels and gear train there between and a second chamber for the crown wheel.

7. An actuator for operating an activating element, said actuator comprising:
   an electric motor which defines a front end and which includes an output shaft extending away from the front end, said output shaft defining a shaft axis,
   a transmission for connection to the activating element, said transmission comprising a first stage comprising a worm gear aligned with said output shaft and driven thereby and a first worm wheel driven by said worm gear, a second stage comprising a crown wheel which faces the front end of the electric motor and a first bevel wheel which drives the crown wheel, said crown wheel including a power take-off means which extends in substantial coaxial alignment with the axis of said output shaft, and said first worm wheel being spaced from said first bevel wheel, and a gear train between the first worm wheel and the first bevel wheel for rotation of said first bevel wheel with rotation of said first worm wheel, and wherein the bevel wheel is conic frustum shaped with a smallest diameter situated closest to an axis of rotation of the crown wheel and having a largest diameter closest to a circumference of the crown wheel, and toothing on the crown wheel has a shape corresponding thereto.

8. The actuator according to claim 6, wherein the first and second chambers are separated by a transversal wall, where a side of the transversal wall facing towards the motor housing includes recesses for bevel wheels, worm wheels and the gear means there between, while an opposite side of the transversal wall includes a shaft journal for the crown wheel, and wherein the worm at least with its outer end is embedded in a hollow in the shaft journal.

\* \* \* \* \*